United States Patent
Wedel

(10) Patent No.: US 7,030,307 B2
(45) Date of Patent: Apr. 18, 2006

(54) MUSIC TEACHING DEVICE AND METHOD

(76) Inventor: Douglas Wedel, 3830 24th St. #4, San Francisco, CA (US) 94114

( * ) Notice: Subject to any disclaimer, the term of this patent is extended or adjusted under 35 U.S.C. 154(b) by 0 days.

(21) Appl. No.: 10/475,418

(22) PCT Filed: Jun. 10, 2002

(86) PCT No.: PCT/US02/19176

§ 371 (c)(1),
(2), (4) Date: May 21, 2004

(87) PCT Pub. No.: WO02/101687

PCT Pub. Date: Dec. 19, 2002

(65) Prior Publication Data

US 2004/0206225 A1  Oct. 21, 2004

Related U.S. Application Data

(60) Provisional application No. 60/298,226, filed on Jun. 12, 2001.

(51) Int. Cl.
*G09B 15/08* (2006.01)

(52) U.S. Cl. .................................................. 84/477 R

(58) Field of Classification Search .............. 84/464 A, 84/464 R, 470 R, 477 R, 616, 654
See application file for complete search history.

(56) References Cited

U.S. PATENT DOCUMENTS

| | | | |
|---|---|---|---|
| 3,456,546 A | 7/1969 | Welsh et al. | |
| 3,482,480 A | 12/1969 | Decker | |
| 3,577,824 A | 5/1971 | Lavan | |
| 3,690,212 A | 9/1972 | Colburn | |
| 3,724,097 A | 4/1973 | Schmoyer | |
| 3,760,680 A | 9/1973 | Moore | |
| 4,098,165 A | 7/1978 | Akiyama | |
| 4,479,416 A * | 10/1984 | Clague | 84/462 |
| 4,779,510 A | 10/1988 | Van den Abbeel | |
| 5,038,658 A * | 8/1991 | Tsuruta et al. | 84/461 |
| 5,069,104 A | 12/1991 | Shibukawa | |
| 5,266,735 A | 11/1993 | Shaffer et al. | |
| 5,585,583 A | 12/1996 | Owen | |
| 5,760,323 A * | 6/1998 | Romero et al. | 84/470 R |
| 5,886,273 A * | 3/1999 | Haruyama | 84/478 |
| 5,889,224 A * | 3/1999 | Tanaka | 84/645 |
| 5,952,597 A * | 9/1999 | Weinstock et al. | 84/609 |
| 6,072,113 A | 6/2000 | Tohgi et al. | |
| 6,388,181 B1 * | 5/2002 | Moe | 84/477 R |
| 6,476,303 B1 * | 11/2002 | Mutou et al. | 84/483.2 |
| 6,689,946 B1 * | 2/2004 | Funaki | 84/478 |
| 6,821,203 B1 * | 11/2004 | Suga et al. | 463/7 |
| 6,870,085 B1 * | 3/2005 | MacCutcheon | 84/477 R |

* cited by examiner

*Primary Examiner*—Jeffrey W Donels
(74) *Attorney, Agent, or Firm*—Rutan & Tucker, LLP

(57) ABSTRACT

Methods and apparatus are provided that help users learn to play one or more instruments by employing simplified note recognition techniques, improved feedback, and a simplified keyboard tablature. In one aspect, users are encouraged to play specified notes within a specified time frame. The pitch and duration can be represented in any suitable manner, but are advantageously displayed together as a single icon (232A–232F). Preferably, the icon has an elongated shape in which the horizontal length correlates with duration of the note, and its vertical position on a display correlates with a pitch of the note. Notes can thus be represented by elongated lines, bars, ellipses, or even missiles or arrows. In another aspect, an improved musical tablature effectively clusters juxtaposed black keys (412A, 412C, 412E) and white keys (412B, 412D) on a display for easier visualization.

32 Claims, 3 Drawing Sheets

MUSIC TEACHING DEVICE AND METHOD

This application claims benefit of Provisional application Ser. No. 60/298,226, filed Jun. 12, 2001.

FIELD OF THE INVENTION

The field of the invention is music teaching.

BACKGROUND OF THE INVENTION

Learning to play an instrument has proved problematic for generations of aspiring musicians, and the use of traditional musical notation has often made such learning even more difficult. Even in advanced countries, only 2–3% of musicians are classified as musically "literate".

A threshold problem is learning to produce desired notes on an instrument. Some individuals seem to pick this up naturally, but others have a great deal of difficulty remembering which keys, strings, or other elements produce which notes. Electronics have been employed for many years to solve this problem.

One class of solutions provides substantially immediate feedback to the user (musician) as to which note is being played. For example, U.S. Pat. No. 3,577,824 to Lavan (May 1971), teaches a device that produces small lighted areas on a display in response to depressions on the keys of a piano. The lights are associated with traditional stave notation, so that the user learns which keys correspond to which notes. More recently microprocessors have greatly extended this solution to the world of desktop, laptop, and even hand-held devices. An example is U.S. Pat. No. 4,827,826 to Hiroyuki et al. (May 1989), which provides a visual display that indicates which notes are being played. A particularly sophisticated embodiment was marketed as a computer game called Miracle Piano™ by Software Toolworks™.

U.S. Pat. No. 3,886,838 to Scherrer (June 1975) teaches a similar approach, in which lights are randomly displayed on a computer screen, with the user trying to identify the notes and play them on the instrument. Here again, substantially immediate (real-time) feedback is provided to the user by the computer.

Problems remain, however, in that these note-to-screen or screen-to-note systems fail to address quality of play. An early mechanical system described in U.S. Pat. No. 3,760,680 to Moore (September 1973) purported to teach playing style, but the Moore system as well as other known systems fail to adequately teach musical expression, changes in tempo, loudness, and so forth. For example, the known systems do nothing at all to teach legato playing, where successive tones are produced in a closely connected, smoothly gliding manner. The importance of legato playing is expressed in the following quote from *How to Teach Piano Successfully*, by James Bastien:

"The execution of the legato principle requires the student to play a key, hold it, and release it when the next key is played . . . . The process requires intricate finger coordination which may take some time to develop. However, it is vitally important for the beginner to understand this process and to be able to do it easily."

See also "pianoFORTE: A System for Piano Education Beyond Notation Literacy," by Stephen W. Smoliar, Institute of Systems Science, National University of Singapore; John A. Waterworth, Department of Informatics, Umea University, Sweden; and Peter R. Kellock, Institute of Systems Science, National University of Singapore, published in ACM Multimedia 95—Electronic Proceedings, Nov. 5–9, 1995, San Francisco, Calif.

Computer based systems have been developed that judge a performance or practice session, and provide feedback on the quality of play. Examples are U.S. Pat. No. 4,098,165 to Akiyama (July 1978) and U.S. Pat. No. 6,073,113 to Tohgi et al. (June 3000). Unfortunately, those systems are extremely complicated, and require the user to understand traditional musical notation.

Traditional musical notation is not straightforward, and the existing systems have not satisfactorily met the challenge of either obviating or conveniently teaching such notation. This failure is in part due to the high level of complexity involved. Traditional musical notation combines two distinct symbol codings, one for pitch, and the other for duration. Correct interpretation of the pitch notation requires constant reference to the key signature, while correct interpretation of duration symbols requires constant reference to the time signature. Other notations code for tempo, playing style, and expression. All of this can be extremely difficult for beginners to master, and indeed even for non-beginners as well.

These difficulties have been addressed over the years through non-traditional musical notations known as tablatures. For example, in the field of stringed instruments, the finger positions are often shown as black dots on a schematic of the frets and/or neck of an instrument. Tablatures are also known for keyboard type instruments. A continuing problem, however, is that the tablatures themselves are too complicated. In piano, for example, tablatures have been invented that provide a line for each black or white key. But there are so many keys that such an approach employs too many lines to be particularly useful. Another problem is that piano keys are usually tuned such that the change in frequency from one key to the next is not at all consistent. Still additional complexity results from the apparently inconsistent pattern in which the black keys are interspersed between the white keys. Yet another problem results from applying traditional nomenclature to a piano type keyboard, because the very same key on the keyboard can be considered a sharp in one key signature, and not sharp in another key signature. What is needed is a tablature that accommodates all these factors, while visually simplifying the keyboard.

None of the known systems have been particularly effective in resolving these problems, and none have been commercially successful. Thus, there is still a need for systems and methods that help users learn to play musical instruments, and to either learn traditional musical notation, or at least learn a tablature that supplements or replaces traditional notation.

SUMMARY OF THE INVENTION

Methods and apparatus are provided that help users learn the playing of one or more instruments by employing simplified note recognition techniques, improved feedback, and a simplified keyboard tablature. Other methods and apparatus are provided that help users learn to sing.

In one aspect users are encouraged to play specified notes within a specified time frame. A preferred system comprises visual representation of a pitch and a time frame, and a visual feedback that identifies whether the pitch is played within the time frame. The pitch and the duration can be represented in any suitable manner, but are advantageously displayed together as a single icon. Preferably the icon has an elongated shape in which the horizontal length is correlated with duration of the note, and its vertical position on a display is correlated with a pitch of the note. Notes can thus be represented by elongated lines, bars, ellipses, or even missiles or arrows.

The time frame can be represented in any suitable manner, including a "window" having leading and trailing edges. To encourage legato playing, and alter the tempo of play, one or both of the icon and the window can appear to move relative to one another on the display. For example, enlarging the window in the proper direction would increase the flexibility of "correct" play, while narrowing the window would require less flexible playing.

The visual feedback can comprise any sort of signal, from a modification in color, intensity, or other aspect of an icon, to a signal that is considerably distanced from the icon. Exemplary feedback strategies include modifications to the color or extent of the icons, time frame, or other elements.

The visual representations of the pitch, the duration, and time frame are preferably electronically generated, and displayed concurrently on a single display, such as a computer screen. Numerous game aspects are contemplated, including, for example, where the icons comprise projectiles or other recognizable shapes. Also contemplated are methods of using this technology to teach musical notation, and playing of musical instruments, especially on a keyboard type instrument, and most especially on a piano style keyboard. To that end statistics can be maintained with respect to a user's playing, and displayed either during or after play. A computer rendition of playing can also be stored electronically during play, and then run through the system at a later date so that the user can observe his playing with respect to one or more parameters.

An improved musical tablature is preferably employed for piano style keyboards, in which representations of juxtaposed black and white keys are clustered on a display for easier visualization. Here, a horizontal gray zone having relative thickness of 5 may represent a clustering of 3 black and 2 white interposed keys, a juxtaposed white zone having relative thickness of 2 may represent a clustering of two white keys, and a juxtaposed gray zone having relative thickness of 3 may represent a clustering of 2 black and 1 white interposed keys. Individual keys can be displayed in their relative positions within the zones as they appear on the keyboard. This simplification enables the tablature to encompass the same 43 key range as the 10 lines of the grand staff with seven gray zones.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
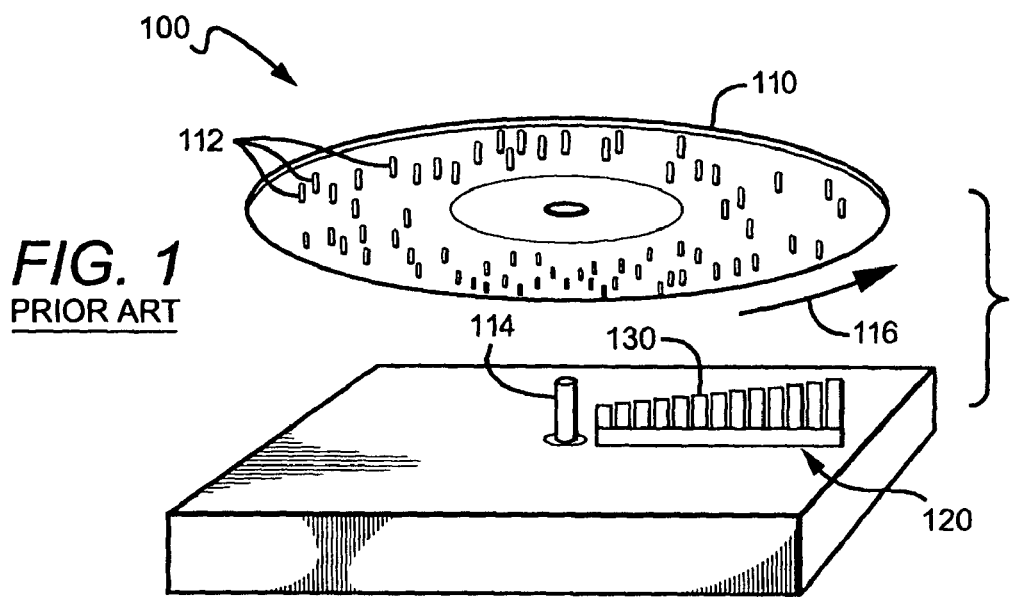
FIG. 1 is a perspective view of a prior art music box.

FIG. 1 is a prior art system of a music box 100. The music box 100 comprises a disk 110 having a plurality of spaced tines 112, and a row of metal pins 120 having various lengths correlated with various notes. As the disk 110 rotates about a spindle 114 in the direction of arrow 116, individual pins 130 contact individual tines 112 in a particular sequence and timing, causing the pins 130 to be "plucked". Vibration of the plucked pins reproduces a musical score. A player piano works in substantially the same way.

Music box technology is very old, and there are doubtless numerous variations known in the field. Significantly, however, all music boxes are based on the limitation that the order and spacing of the notes is entirely fixed. Other than variations in how fast the disk or cylinder rotates, which consequently affects the tempo of the music produced, there is no flexibility at all that would give rise to "expression" of the player. In other words, individual notes are not played within an allowable time frame (playing window), but are always played according to a predictable timing. If one were to interpret music box playing in terms of time frame, the time frame would be zero. This is not what is contemplated herein, where time frames are always considered to be non-zero.

Figure 2:
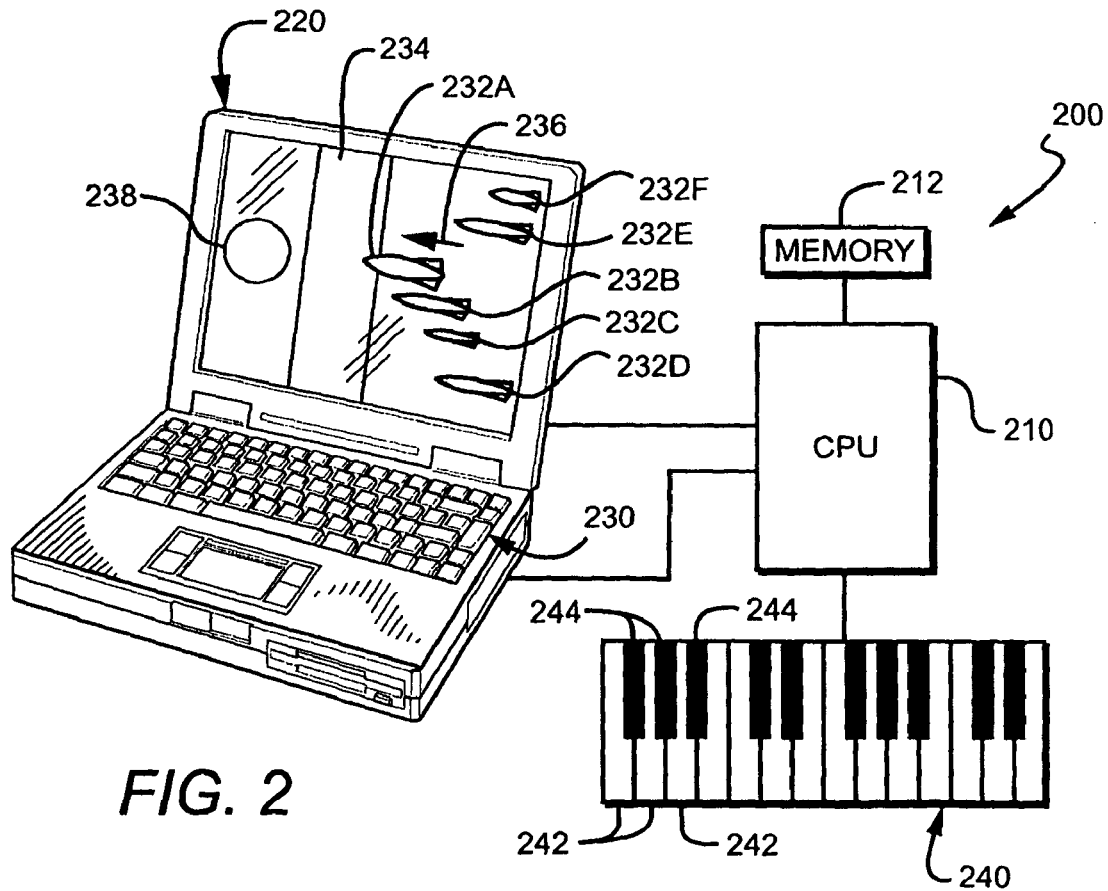
FIG. 2 is a schematic of a system according to the inventive subject matter that includes a computer running a computer game, and a screen display providing visual feedback to a user.

FIG. 2 generally depicts a system 200 having a processor 210 operatively coupled (in a manner not shown) to a memory 212, a display screen 220, and keyboards 230 and 240. The display generally depicts the playing of a game in which a plurality of missiles 232A–232F move leftward towards a window 234 as shown by arrow 236, and a target 238.

System 200 is depicted here as a modern laptop computer system. Such depiction is intended to be illustrative rather than limiting. It is contemplated, for example, that in the future the processor 210 and memory 212 (depicted here as partially exploded from the remainder of the computer) could be much smaller, or located outside of the computer screen housing. The computer and memory portion of the system could, for example, be located at a distal hosting computer many miles away. The computer and memory portion of the system could also be included as part of a single board computer that fits in the keyboard, or on the user's person. Similarly, the "screen" could be a stand alone CRT, liquid crystal or other display, a projection on a wall or onto a pair of glasses, or even an electrical connection directly into a user's brain distal. By way of further illustration, keyboard 230 is a standard QWERTY keyboard, and keyboard 240 is a standard, or non-standard sized musical type keyboard. Either or both of those keyboards may be split into two or more physically separate pieces, and either or both are optional. In that regard virtual keyboards are contemplated where electronics are used to detect movements of the user's fingers in the air, or on an ordinary desktop, or anywhere else.

It is currently preferred that the processor 210 is housed in a laptop computer electronically connected to a stand-alone CRT or liquid crystal display screen. With current programming technology, suitable laptop computers advantageously include a processor clock speed of at least 500 MHz, a memory of at least 2 GB, and at least one I/O card (not shown) capable of a MIDI connection to a musical instrument or keyboard. Keyboard 240 is preferably laid out in the manner of a normal electronic piano keyboard, with both black and white keys.

In accordance with traditional terminology, the term "key" is used herein with reference to both physical keys and musical keys. Physical keys can be any collection of physical or virtual spacing of operational elements used to produce sounds of varying pitches. The usual reference is to the keys of a keyboard instrument such as mechanical or electronic piano, although keys on a French horn, oboe, or other instrument are also contemplated. Musical keys are collections of pitches in traditional staff notation to which a musical piece may be limited. Exemplary keys are G, F#, and C.

The terms "black" and "white" with reference to keys refers to the black and white keys of a piano or piano style keyboard. The white keys (e.g., numbers 242 in FIG. 2) are generally used to produce one type of note, such as non-sharp and non-flat notes, while the black keys (e.g., numbers 244 in FIG. 2) refer to another type of note, such as sharps or flats, at least on a particular key. Of course, it should be understood that the "black" and "white" keys referred to herein need not actually be black and white in color. They could instead be green and gold, or black and ivory, white and white, or any other color patterns. The "black" and "white" keys could additionally or alternatively be raised or not-raised, rough or smooth, or even laid out on separate levels as in an organ keyboard.

In the particular example of FIG. 2, the display screen 220 depicts the playing of a game in which a plurality of missiles 232 move leftward towards a target 238 in the direction of arrow 236. The missiles 232A–232F are disposed spatially across the screen such that their vertical position relates to different pitches, with the higher positions relating to higher pitches, and the lower positions relating to lower pitches. In this example missile 232A corresponds to note middle C, while missile 132B corresponds to note B above middle C. The missiles 232A–232F are also configured horizontally in an elongated fashion corresponding to lengths (i.e., durations) of notes. Here, missile 232A corresponds to a quarter note, and is half as long as missile 132B, which corresponds to a half note.

A window 234 is interposed in the path of the missiles and the game aspect involves the player (also referred to herein interchangeably as the user) pressing a key on the musical keyboard 240 while individual ones or multiples of the missiles 232A–232F traverse the window 234. To destroy each missile and prevent it from reaching the target 238 (which may, for example, be depicted as the Earth), the user must press the correct key on the keyboard 240 that corresponds with the pitch depicted by the missile. The player quickly realizes that pressing of the keyboard keys in the sequence and timing required to destroy them results in playing of a musical score.

To encourage legato playing, preferred embodiments require that the correct key on the keyboard 240 be played for a sufficient time period corresponding to the length of each missile, as the missile crosses the window 234. In a preferred game, pressing the correct key in that fashion causes the corresponding missile to "explode" and vanish from the screen. The correct duration is typically at least 0.2 seconds, but may be at least 0.5 seconds, at least 1 second, at least 2 seconds, at least 5 seconds or even longer. Pressing a wrong key, or pressing a correct key when the corresponding missile is not crossing the window 234, will not destroy the missile. When some number of missiles passes through the window 234 to the target 238, the game is terminated.

Many variations should be apparent to those skilled in the art. As a simple example, the speed with which the missiles move relates to tempo of the score being played, and the speed can be altered by the computer, the user, or both. As another example, the missiles 32A–232F need not move towards the window 234. Instead, the window 234 may move towards the missiles 32A–232F. As yet another example, the missiles 232A–232F could be made to change color, or intensity, or brightness, or some other characteristic rather than exploding.

It should be appreciated that the missiles 232A–232F are merely icons for notes, preferably notes in a musical score. Other icons could be used as well, including other military themed icons, or non-military theined icons. By way of example, contemplated icons include elongated rectangular bars or narrow ellipses, or well known objects such as hats or automobiles. Moreover, in other embodiments the elongation could be replaced by some other signification, including, for example, a color or a brightness. In still other (much less preferred) embodiments, it is contemplated to separate out the icons into their pitch and duration parameters, so that two representations are employed for each note.

Figure 3:
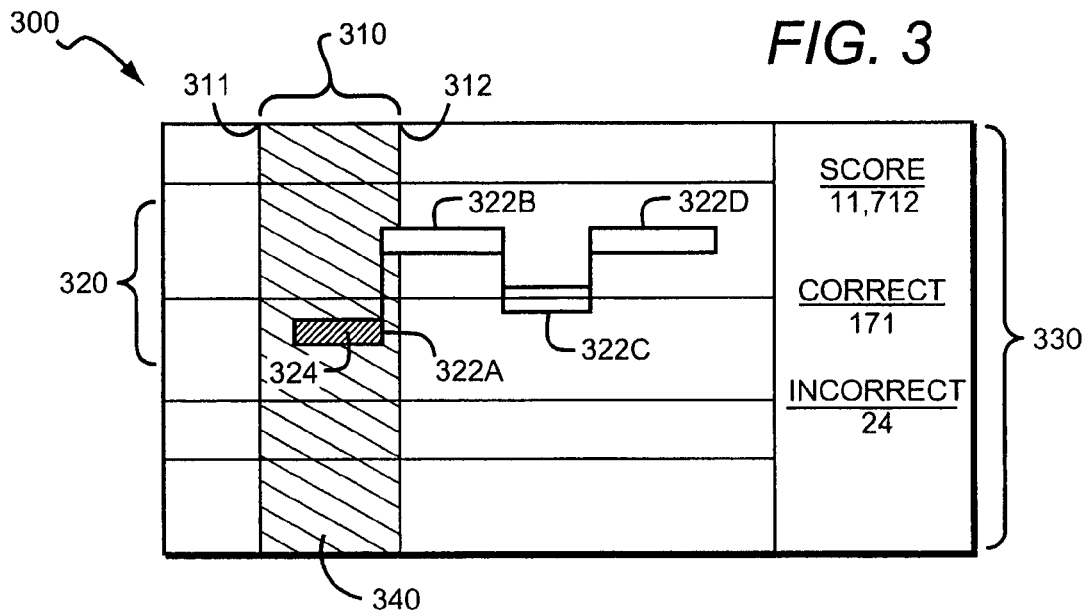
FIG. 3 is a schematic of a screen display depicting a tablature as part of a computer game.

FIG. 3 generally depicts a display 300 having a window 310 with a left side 311 and a right side 312, a tablature 320 comprising icons 322A–322D and shaded zones 340, a feedback representation 324, and statistics 330.

The window 310 is a visual depiction of a time frame. Here, the window 310 is a shaded zone on the display that defines a time frame within which the user attempts to play a pitch for a corresponding duration. The term "shaded" is used here in its broadest possible context. "Shading" may be represented by any or all of a darkening, a color change, an apparent texture change, and so forth.

While it is preferred to have only one window, multiple windows are contemplated. For example, one could have one window for the playing of one hand, and a second window for the playing of another hand. It is also possible to have multiple windows for multiple players in a band, orchestra, or other cluster. The multiple windows would then preferably be spread out across multiple screens.

The time frame is defined by the amount of time it takes for an icon (or at least some specified portion of the icon) to traverse the window. Certainly, the icon could move toward a stationary window, the window could more toward a stationary icon, or both window and icon could move toward each other. In a preferred class of embodiments, the icon moves and the window is stationary. In this class, a substantially correct response involves the user playing the note while the leading edge of the icon is visually located between the right side 312 of the window 310 and the left side 311 of the window 310. Additionally, in order to achieve a substantially correct response, the user may be required to hold the note for a duration corresponding to the length of the icon.

The time frame within which the user is to play the note is affected by the rate at which the window or icon moves, and the width of the window. Thus, the time frame decreases as the rate of movement goes up and the size of the window goes down. The user or the computer may advantageously control some or all of these factors. For example, a beginner may not be able to play the note within the time frame if the rate of movement is relatively fast. For learning purposes, the computer may start out with a relatively wide window, and relatively slow icon movement. As the player progresses, the window may be narrowed somewhat, and the movement of the icon may be increased.

The tablature 320 comprises icons 322A–322D, set against a background of juxtaposed grayed and white zones. The position of the icon within a zone preferably corresponds to the position of the corresponding physical key on a keyboard. As described above, the icons are preferably displayed using an elongated shape in which the length correlates with the duration. A more detailed description of the tablature 320 is discussed with FIG. 4.

Embodiments of the inventive subject matter may optionally include some sort of visually recognizable feedback 324 as to whether the player played the pitch for the duration within the window. Feedback 324 may be represented as a visually recognizable alteration in the icon such as a change in color, form, or some other visually recognizable change. A change in color may include changes in intensity, shading, brightness, hue, saturation, reflective properties, and so on. Changes in form may include a representation of the icon "blowing up" being destroyed, or being visually eliminated. Feedback 324 may be represented by a change in an extent of the icon including size.

Feedback 324 in the form of a visually recognizable alteration may be correlated with a user failing to properly play the pitch for the duration within the time frame or the user playing the pitch for longer than the duration. For example, the alteration may be visually displayed as a green light, yellow light, or red light depending on relative correctness. It is also contemplated that the feedback 324 may be represented by something other than an alteration in the icon such as a visual indication next to the icon, a sound, a graph, or merely a change in score.

Feedback 324 is preferably displayed in a prompt manner so that the player can quickly alter his/her playing. Preferred feedback occurs in less than 2 seconds, more preferably in less than 1 second, and still more preferably displayed in less than 0.5 second. In current computer argot, such feedback may be said to occur in "real-time". That term, however, is difficult to define precisely because display of the feedback 324 will likely vary substantially depending on variables such as CPU speed, contention for resources, and communication line speed.

Statistics 330 may comprise any useful summarization of play, including such values as elapsed time, level of play, temp, number of notes played correctly and incorrectly, and so forth. These statistics may be presented as numbers, graphs, icons, and so forth. For example, quality of play may be presented as a position on a bar, or a color from green to yellow to red. Some or all of the statistics may be stored and recalled, and perhaps averaged over multiple sessions. Such information may be transmitted to a remote sight, and thereby, users may enter contests, communicate with teachers remotely, and compete with one another.

Figure 4:
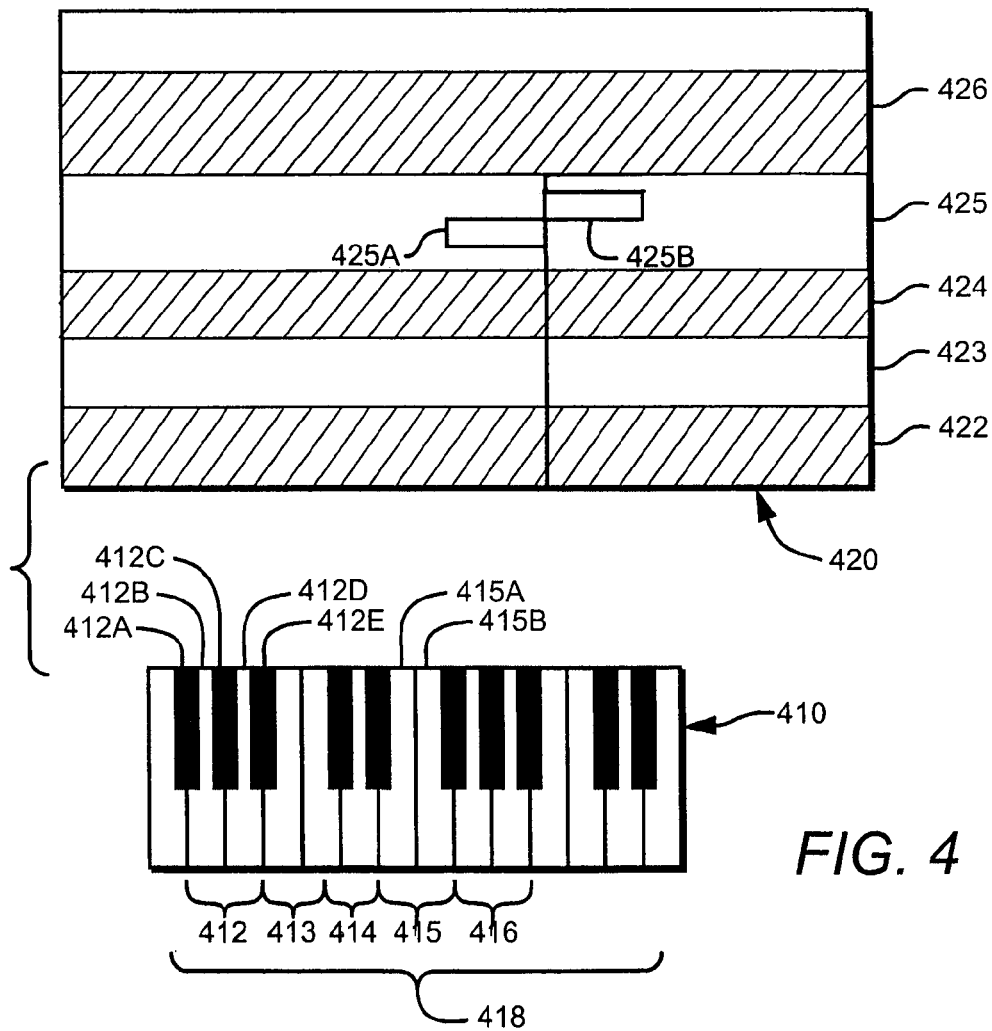
FIG. 4 is a schematic of a correspondence between a keyboard and a musical tablature.

FIG. 4 generally depicts a schematic of a correspondence between a keyboard 410 and a tablature 420. The keyboard 410 comprises clusters of keys 412–416, respectively, which correspond to shaded zones 422, 424, 426 and unshaded zones 423 and 425 of the tablature 420. Those skilled in the art will immediately recognize that each of the shaded zones 422, 424, 426 represents at least 2 black keys and at least one intervening key. Thus, shaded zone 412 represents three black keys 412A, 412C, 412E and two intervening white keys 412B and 412D. The non-shaded or white zones 423, 425 occur whenever there are two juxtaposed white keys on the keyboard 410.

Icons on the tablature are represented as described above, positioned in the proper shaded or unshaded zone, and vertically within the zone as a function of the respective position of the corresponding key within the cluster. Thus, icons 425A, 425B correspond to physical keys 415A, 415B, respectively. Additional embodiments include a tablature that comprises at least some Braille, and in this respect, it is further contemplated that a tablature may be specially printed in Braille.

The specific clustering here is thought to be particularly advantageous, but not absolutely necessary. It would be possible, for example, to cluster together 2 black keys, an intervening white key, and the two outside juxtaposed white keys. Furthermore, the terms "shaded" and "non-shaded" or "white" are to be construed euphemistically, to refer to any visually distinctive renderings. Thus, "shaded" keys may actually be dark green while "non-shaded" or "white" keys are light green. Similarly, "shaded" keys may actually be striped while "non-shaded" or "white" keys are stippled. In any case, by clustering keys and associating the clusters with shaded zones on the tablature, an improved tablature is provided.

Figure 5:
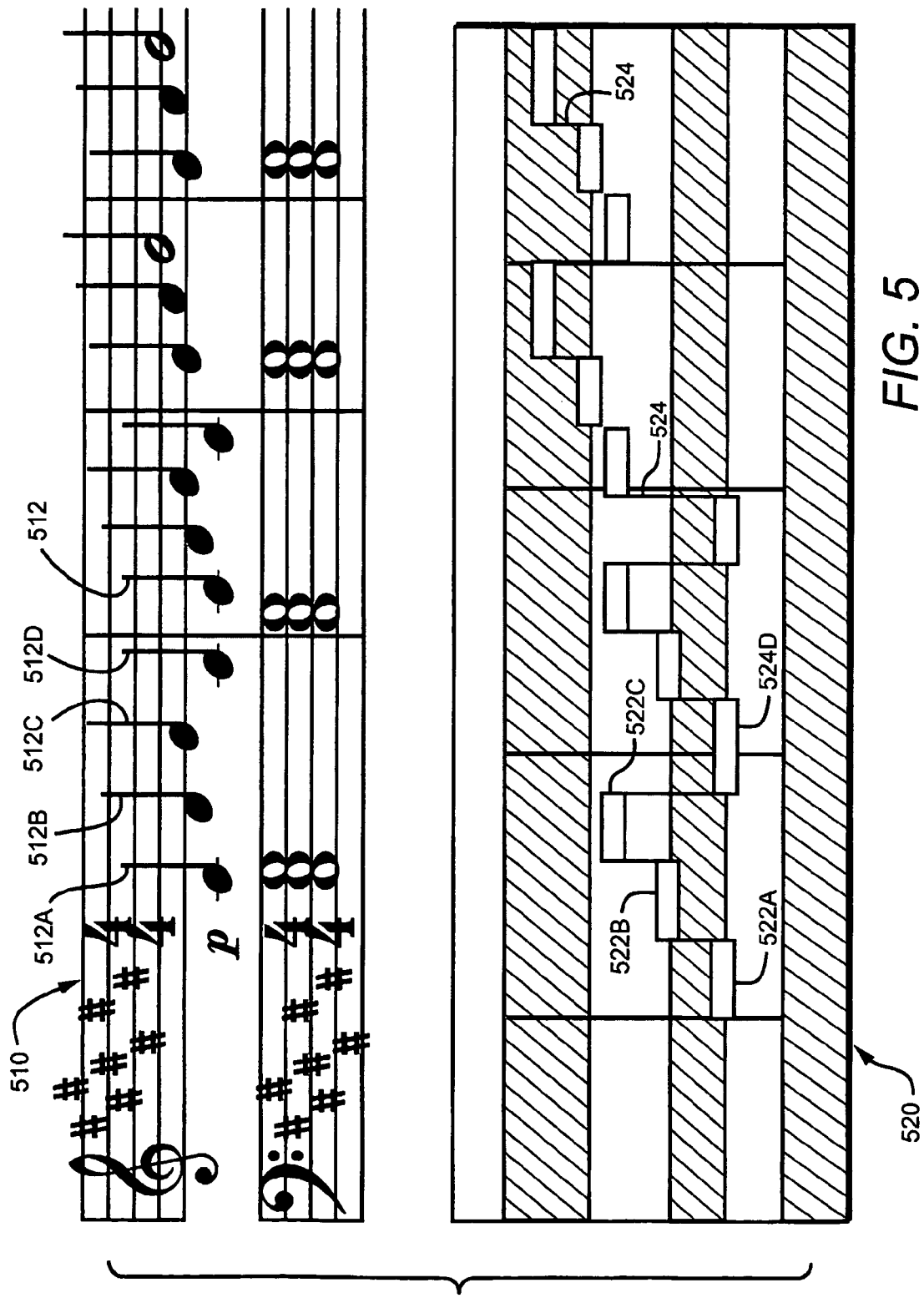
FIG. 5 is a schematic of a correspondence between a traditional musical notation and a corresponding tablature.

FIG. 5 is a depiction of a correspondence between a traditional staff type musical notation 510, and a corresponding tablature 520 of a few bars of the song "Frere Jacques". Those skilled in the art will appreciate that FIG. 5 is entirely analogous to FIG. 4. Here, quarter notes 512A–512D in the traditional notation 510 correspond to quarter-note length bars 522A–522D in the tablature 520. The vertical lines such as 524 in the latter indicate that a given succeeding note should be played immediately after the preceding note.

The notes, which would be played by the left hand are not represented in the tablature 520. Such notes could, however, be represented by appropriate symbols.

Thus, specific embodiments and applications of music teaching devices and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system comprising:
    a visual representation of a pitch and a duration as a single icon, wherein the icon is displayed using an elongated shape having a length correlated with the duration, and where a vertical position of the icon correlates with the pitch;
    a visual representation of a time frame; and
    a visual feedback that automatically identifies when the pitch is played within the time frame for the duration; wherein the visual feedback identifies when the pitch is played for the duration.

2. The system of claim 1 wherein the visual representations of the pitch and the time frame are electronically generated.

3. The system of claim 1 wherein the visual representations of the pitch and the time frame are displayed concurrently on a single display.

4. The system of claim 1 wherein the pitch and the duration are represented in a single icon.

5. The system of claim 1 wherein the icon is displayed using an elongated shape having a length correlated with the duration.

6. The system of claim 5 wherein the elongated shape comprises a projectile.

7. The system of claim 1 wherein at least one of the icon and the time frame appears to move relative to the other.

8. The system of claim 1 wherein a movement of at least one of the icon and the time frame relative to the other comprises a computer game.

9. The system of claim 1 wherein at least one of the icon and the time frame appears superimposed upon the other in a display.

10. The system of claim 1 wherein the visual representation of the time frame comprises the visual representation of the icon.

11. The system of claim 1 wherein the duration is at least 0.2 seconds.

12. The system of claim 1 wherein the duration is at least 0.5 seconds.

13. The system of claim 1 wherein the visual representation of the time frame comprises a window displayed as a distinct area on a display screen, and the window appears to move relative to the icon.

14. The system of claim 1 wherein the visual representation of the time frame comprises a window displayed as a distinct area on a display screen.

15. The system of claim 14 wherein the window comprises a left side and a right side.

16. The system of claim 1 wherein the visual feedback comprises a visually recognizable alteration in the icon.

17. The system of claim 16 wherein the visually recognizable alteration comprises a change in color of the icon.

18. The system of claim 1 wherein the visually recognizable alteration comprises a change in an extent of the icon.

19. The system of claim 1 wherein the visually recognizable alteration is correlated with a user failing to properly play the pitch for the duration within the time frame.

20. The system of claim 1 wherein the visually recognizable alteration is correlated with a user playing the pitch for longer than the duration.

21. The system of claim 1 further comprising a plurality of other icons that visually represent a plurality of other tone and corresponding duration combinations, respectively, such that an ordered production of the tones for the corresponding durations within the time frame comprises playing of a musical score.

22. The system of claim 21 further comprising a processor programmed to store playing of the tones and corresponding durations, and later display corresponding visual representations of the stored tones and corresponding durations.

23. The system of claim 1 further comprising a visual representation of a traditional music notation concurrently displayed with a non-traditional tablature.

24. The system of claim 23, wherein the non-traditional tablature comprises Braille.

25. The system of claim 1 further comprising a foot pedal that triggers a modification in an electronic representation of a musical score that corresponds to turning of a page in a printed representation of the musical score.

26. A method of operating a device comprising:
    depicting a plurality of icons on an electronic display as part of a computer game, each of the icons representing a pitch/duration combination in a musical score and vertical position of each of the icons correlates with the corresponding pitch;
    providing a visual representation of a window of time;
    playing a musical instrument to produce tones corresponding to the plurality of pitch/duration combinations; and
    visually modifying a specific one of the plurality of icons as a function of whether the corresponding pitch is played for the corresponding duration while the specific icon is visually apparent within the window.

27. The method of claim 26 wherein the step of physically manipulating the device comprises pressing a key on a piano style keyboard.

28. The method of claim 26 wherein the step of physically manipulating the device comprises playing a musical instrument other than a keyboard type instrument.

29. A method of teaching a user to play a musical instrument, comprising:
    the method of claim 26, wherein the step of physically manipulating the device further comprises playing a musical instrument; and
    having the user repeat a segment of pitch/duration combinations in which the user was unsuccessful in playing the specific pitch for the specific duration while the specific icon is visually apparent within the time frame.

30. A method of improving a user's playing of a musical instrument, comprising:
    the method of claim 26, wherein the step of physically manipulating the device further comprises playing a musical instrument; and
    providing a statistic that summarizes an extent to which the user was successful in playing pitches for the corresponding durations while the corresponding icons are visually apparent within the time frame.

31. A musical tablature for a keyboard instrument comprising:
    a single graphic element that represents a cluster of at least 2 black keys and at least one intervening white key, and that represents individual notes relative to the cluster; and
    a second cluster representing at least 3 of the plurality of black keys and at least 2 intervening of the plurality of white keys.

32. The system of claim 1 wherein the pitch and duration are represented in a single icon.

* * * * *